United States Patent Office 3,421,636
Patented Jan. 14, 1969

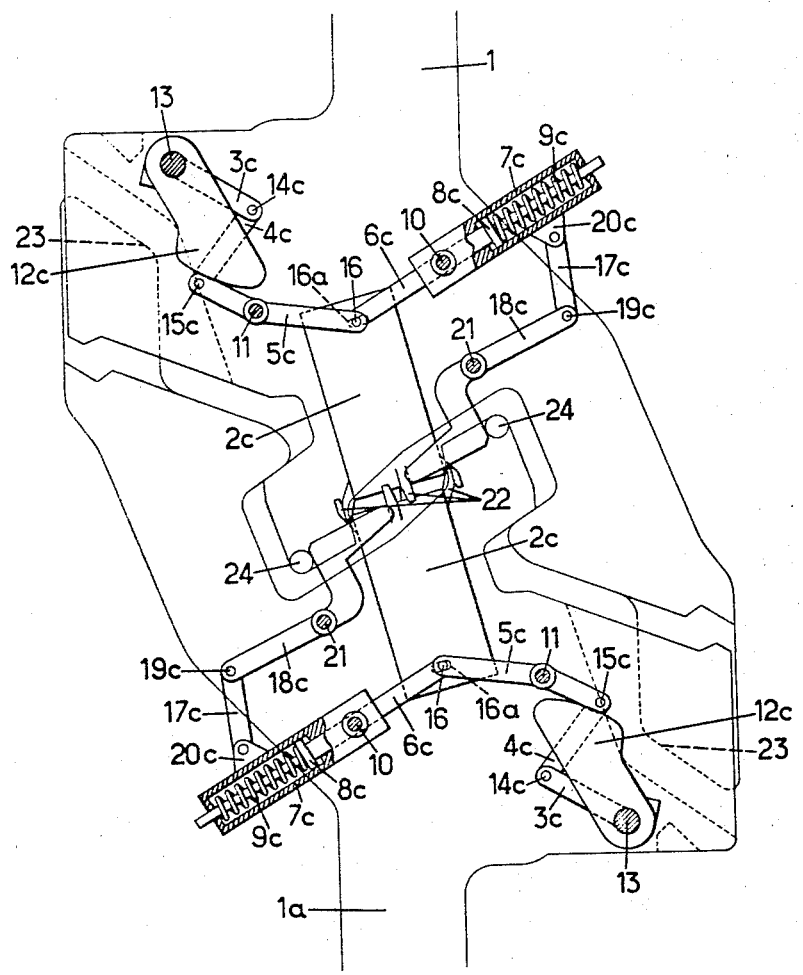

3,421,636
AUTOMATIC TRAINLINE CONNECTOR
Marius Georges Dufourmantel, Paris, France, assignor to Societe Financiere et Industrielle de Chemin de Fer, Paris, France, a corporation of France
Filed Oct. 31, 1966, Ser. No. 590,836
Claims priority, application France, Nov. 5, 1965, 37,480
U.S. Cl. 213—76                 7 Claims
Int. Cl. B61g 5/06

ABSTRACT OF THE DISCLOSURE

A rigid or semi-rigid jaw coupler for railway cars having a service line connector movably associated therewith. The connector is advanced to an operative position from a retracted inoperative position by operation of mechanism carried by the coupler as a member of the mechanism engages another coupler during a coupling operation.

---

It is an aim of the invention to provide an efficient and economical design which in operation allows a substantially automatic and trouble-free connection of the service line connectors on two identical couplers and which has other advantages.

According to the invention, I provide a rigid or semi-rigid jaw automatic coupler having a service line connector associated therewith in which the service line connector is mounted on the coupler head for movement towards and away from a co-operable connector on an adjacent coupler head, in which a mechanism including a spring is connected to the service line connector to effect such movement, and in which the mechanism includes a sensing member engageable by a part of the said adjacent coupler head upon coupling of the two coupler heads, the sensing member when so engaged serving to effect movement of the said service line connector towards the co-operable connector.

In this specification the phrase "service line connector" is to be taken to include a connector having one or more fluid conduits through which pass in operation any or all of the following: hydraulic fluid for braking, compressed air, fluid for heating or various control functions; and, optionally having electrical contacts which upon the junction of two connectors allow the passage of current for train lighting or other purposes.

One embodiment of a rigid jaw coupler according to the present invention will now be particularly described, by way of example and not of limitation, in the following description and with reference to the accompanying drawings in which:

FIG. 4 shows the respective positions of the connectors at a stage in the uncoupling of opposing couplers.

FIG. 1 shows a rigid jaw coupler having a head 1, intended to co-operate with an identical coupler head 1a (FIGS. 2-4) of an adjacent railway vehicle or car.

Figure 1:
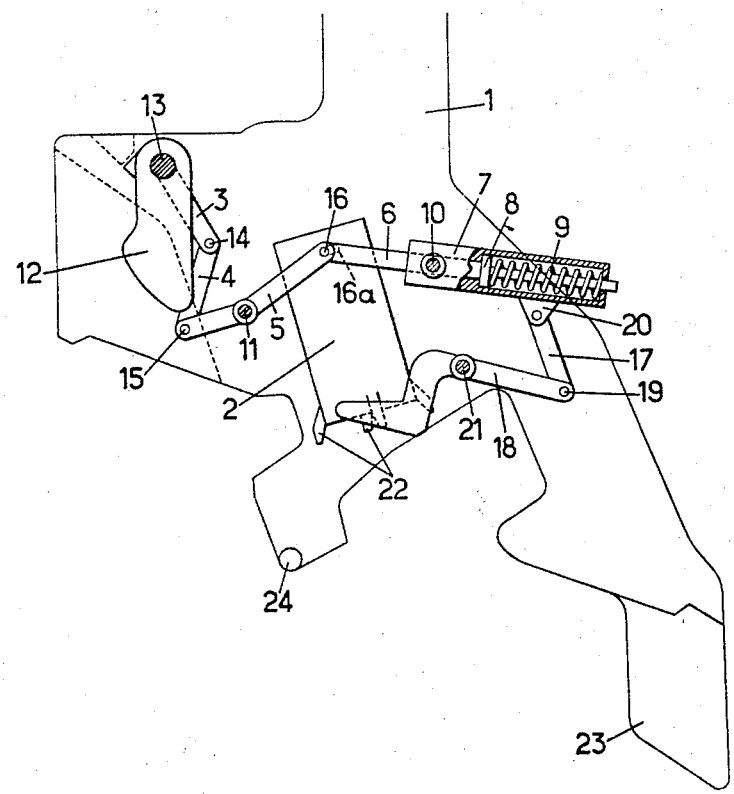
FIG. 1 shows in plan view the retracted position of the connector on a rigid jaw coupler before appreciable compression of the said spring.

The connectors 2 are located in a plane below that of the jaws 1, 1a. The connectors 2, 2a are moved towards and away from each other by a mechanism located in a plane below that of the jaws 1, 1a. This mechanism comprises connecting links 3 and 4, a bell crank lever 5 and a rod 6 slidable within a cylindrical housing 7. The end 8 of the rod 6 serves as an abutment or piston and is subject to the action of a compression spring 9, contained within the housing 7. The latter is pivotally connected at 10 to the coupler head 1 for rotation about an axis that is vertical in the normal operational position of the coupler.

The lever 5 is pivotally mounted at 11 on the coupler head also for rotation about an axis that is vertical in the normal operational position of the coupler. The link 3 is rigidly secured to a sensing member or cam 12 which is mounted on the coupler head 1 for rotation about a pivot axis indicated by reference numeral 13. The link 4 is pivotally connected at one end at 14 to the link 3 and at the other end at 15 to the lever 5. The lever 5 and the rod 6 are pivotally connected by a pivot pin 16 and this pin extends (downwardly) into an elongated slot 16a provided in the connector 2. These parts 5 and 6, in conjunction with the pivot points 10, 11 and 16 and the spring 9 form a toggle linkage that in the relative positions of the parts shown in FIG. 1 urges the connector 2 away from a co-operable connector toward a retracted position and in the relative positions of the parts shown in FIG. 3 urges the connector 2 towards its co-operable connector to and advanced position.

It will be seen from the description which follows that when the cam 12 is engaged by a part of the opposite coupler head, in a coupling operation, the rotation of the cam 12 about the axis 13, in an anticlockwise direction, causes the pivotal connection 15 to move upward as seen in the drawing, causing the lever 5 to pivot around the fixed axis 11. This pivoting of the lever 5 causes a movement of the pivot pin connection 16 in a direction towards the opposite coupler head and a displacement of the pin 16 to the right-hand end of the slot 16a as seen in the drawing.

During the said movement, the pivoting of the assembly constituted by the housing 7 and the rod 6 around the pivot axis 10 is accompanied by a compression of the spring 9.

FIG. 1 also shows a second mechanism for causing the connector 2 to move away from a similar connector 2a (FIGS. 2-4) during an uncoupling operation. The said second mechanism comprises a link 17 and a bell crank lever 18, pivotally connected at 19. The link 17 is also pivotally connected to the housing 7 by a bracket 20. The lever 18 can pivot around a fixed pivot pin 21, the latter being mounted on the coupler head 1.

The connector 2 terminates at its front end in four bevelled elements 22 designed to co-operate with similar elements of the connector mounted on the opposite coupler head, so as to favour, on the one hand, the registry of the two connectors in a coupling operation, and on the other hand, to facilitate a good joint between the connectors. The latter is assisted by the action of the springs 9.

Figure 2:
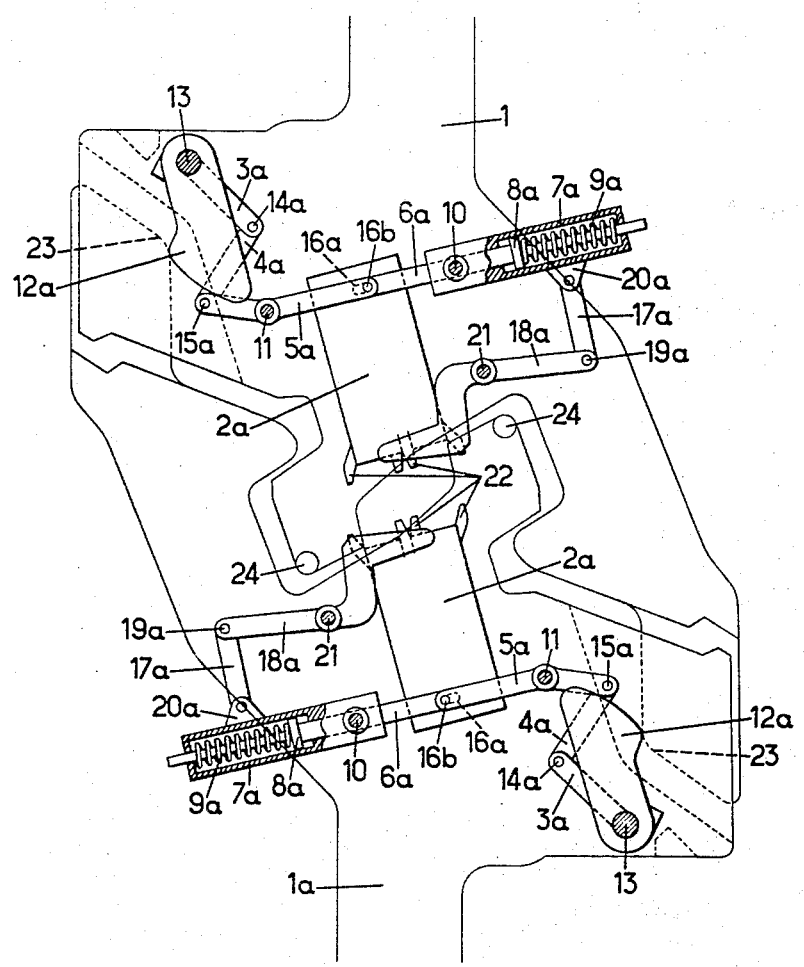
FIG. 2 shows two rigid jaw couplers in the course of coupling before these jaws have been locked together in their final coupling position.

In FIG. 2, the cam 12 is now in a position 12a, while the parts 3-6 have taken, respectively, the positions 3a, 4a, 5a and 6a.

As seen in FIG. 2, the pivot pin 16 has moved as shown at 16b toward the opposite coupler head and at the same time, there has been a movement of the pin 16 to the right-hand end of the slot 16a.

The spring 9 is then compressed to the maximum, in contrast to the position of FIG. 1, and once the cam 12 has been moved by the aligning wing 23 a sufficient distance to push the parts 5 and 6 beyond the toggle dead centre position the effect of the compression spring 9 is to cause the connector 2 to continue to move forwardly, i.e. towards a co-operable connector, even though the wing 23 exerts no further force on the cam 12. It is sufficient for the wing 23 to push the cam 12 slightly beyond the position 12a.

It is seen from FIG. 2 that the cam 12 mounted on the opposite coupler head 1a is similarly subject to the action of the projecting wing 23 of the head 1, in its position 12a.

The parts mounted on the two opposed heads 1 and 1a have the same reference numbers, and the pivot points 10–11–13 occupy fixed positions in relation to their respective coupler heads.

Figure 3:
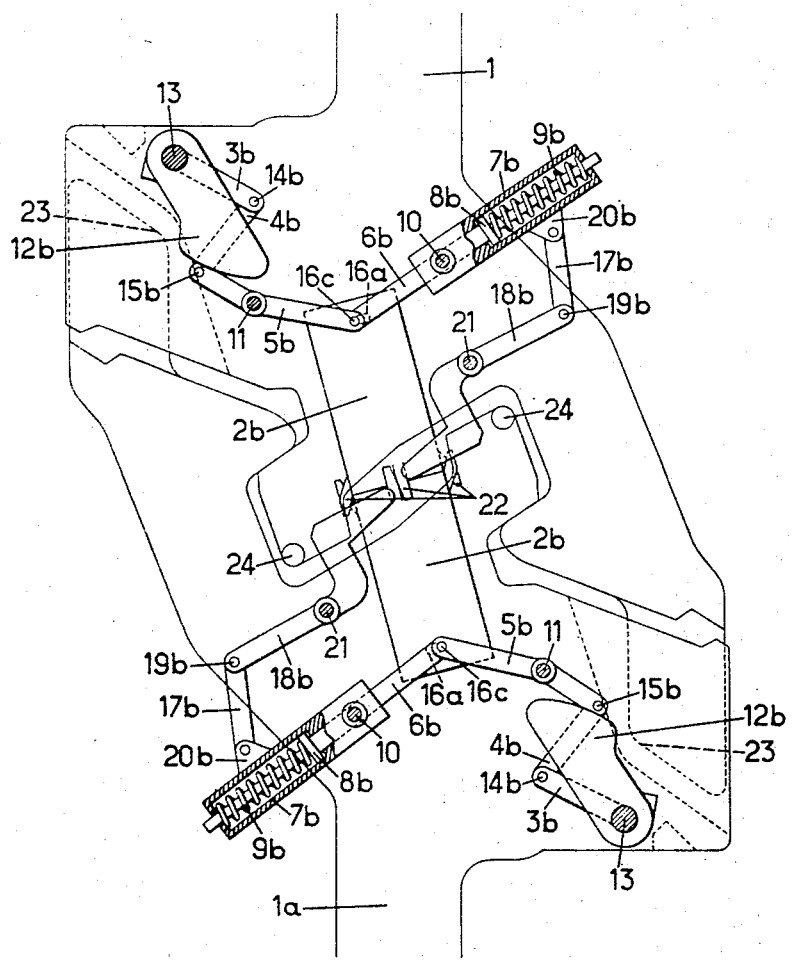
FIG. 3 shows the position of the two connectors, after coupling of the two opposed jaws, and the position, still partially compressed, of the two springs which urge the connectors into end to end contact.

In operation, the lateral and longitudinal movement of the two heads 1 and 1a in relation to each other, up to the coupling position, causes at the same time a movement of the two connectors 2 until the moment when, in the position shown in FIG. 3, the axes of these connectors coincide. The bevelled profile of the elements 22 facilitates the engagement and registry of the two connectors 2, this being assisted by the action of the two springs 9.

In the coupled position, FIG. 3, a very good sealing is obtained because of the guiding effect exerted by the elements 22 to give the coincidence between the axes of the two conduits, and because of the push exerted by the two springs 9 tends to apply the two conduits 2 one against the other.

In this coupled position the cams 12 have taken the position 12b, while the different elements of the mechanism have moved respectively, into positions 3b, 4b, 5b and 6b.

It should be noted that the piston 8 co-operating with the spring 9 has not returned completely to the end of the housing 7 in the said coupled position under the effect of the spring 9. Consequently a pressure is still exerted by this spring and this tends to apply the two connectors against one another as shown at 2b in FIG. 3.

The joint pin 16 has then come into a position 16c after being moved in a left-hand direction in the opening 16a, and the spring 9 is not yet completely released.

The movement of the cam 12 so produced to the position 12b causes its complete disengagement from the projecting wing 23 of the opposite coupler head.

The uncoupling between the jaws of the heads 1 and 1a, as will be seen from FIG. 4, by lateral and longitudinal movement of one head in relation to the other, causes two lugs 24, one mounted on each of the heads 1 and 1a to come in contact with the front part of the bell crank lever 18 on the opposed head. This causes pivoting of this lever around the pivot axis 21.

The links 17 on each head are then pulled toward the opposite head which causes the housing 7 to swing into the position 7c seen in FIG. 4, starting a withdrawing movement of each connector 2 away from the other.

This action of the lug 24 on the front part of the lever 18 is continued until the moment when the connectors have just passed beyond the position seen in FIG. 2, a position in which the toggle elements 5a and 6a are in alignment.

Thereafter it is the compressive force of the spring 9 which causes the retraction movement of the connectors to continue, until they are again in the position shown in FIG. 1, the disengagement of the two heads 1 and 1a then being sufficient so that the cam 12 is no longer subjected to the action of the opposite head.

At the end of the uncoupling, instead of the cam 12 tending to compress the spring, as occurs at the beginning of the coupling, it is the cam 12 which is pivoted under the action of the spring 9.

The pivoting of the bell crank lever 5 around the fixed pivot axis 11 is accompanied by movement of the pivot pin 16 relative to the elongated slot 16a in the connector.

The device which has just been described has the advantage that each of the movements of the connector, both that instituted by the rotation of the cam 12, and that instituted by the projection 24, is such that the connectors do not move under a specific applied force through more than half their total movement between their coupling position and their uncoupled position. Their movement continues then, in both cases, because of the pressure exerted by a spring, which is never completely released, even in the position of total uncoupling. This permits the damping of any starting of accidental operation of the device, due to a shock or inertia effect, as the said spring still remains sufficiently compressed in the coupled position to hold the connectors together.

In an alternative embodiment of the invention, not illustrated, the two connectors may be subject to the action of two independent springs tending to block or hold them in their uncoupled position. However such an arrangement must be located so as not to obstruct the movement of the said mechanisms.

Naturally, other changes, improvements or additions may be made to the mode of execution just described, or certain elements may be replaced by equivalent elements without departing from the invention.

The invention specifically disclosed herein relates to a device provided on each of the two jaws of a coupler of the rigid or semi-rigid type or rail vehicles, to assure, in their coupling, the automatic advance of at least one service line connector mounted on each of said jaws and the consecutive engagement and registry of the said connectors; this device assuring, in the uncoupling operation, a sufficient retraction of these connectors so as not to interfere with the uncoupling.

The device specifically disclosed has as its main advantage, as compared with couplers of conventional types, that of avoiding any permanent contact of the command or control elements of the connector with the opposite jaw of the said rigid coupling, from the moment when the said jaws are coupled, which makes it possible to avoid subjecting the coupled connectors to forces applied by the opposite jaw, and which might injure the hermetic sealing of the braking system, during the operation of the train.

Another advantage of the device disclosed herein resides in the fact that the manual neutralization devices which generally have to be applied when it is desired to couple a coupling of the rigid type to a coupling of the free type, which can move vertically, do not have to be used when the automatic coupler disclosed is used.

Also the springs which tend to support the two connectors, respectively, in coupling position, against the opposed connectors, tend also to hold these connectors in a position well clear of any possible danger, and to prevent any possible displacement of appreciable amplitude of the connectors from their positions under the effect of shocks transmitted to the connectors.

I claim:

1. A rigid automatic coupler comprising:
   a service line connector associated therewith and mounted on the coupler head for movements relative thereto to advance or retract the connector relative to a cooperable connector on an adjacent coupler head;
   a mechanism comprising a sensing member engageable by a part of said adjacent coupler upon coupling of the two coupler heads, a spring, a toggle linkage connecting said member and said connector, said linkage being movable through a dead-center position in shifting the connector between advanced or retracted positions, said member when so engaged acting on the linkage to advance the connector, said spring acting on the linkage to bias the connector toward the position of said connector positions which is advanced or retracted with respect to said dead-center position.

2. A coupler according to claim 1 in which the said linkage is connected to the connector by a pin-and-slot connection, the slot extending transversely of the direction of movement of the connector.

3. A coupler according to claim 1 in which the toggle linkage comprises a pair of members pivotally connected to the coupler head at points equidistantly-spaced from a vertical plane containing the direction of movement of the connector.

4. A coupler according to claim 3 in which one of the said members is in the form of a rod acted on by the said spring and constrained by a cylindrical housing to move only in the direction of its longitudinal axis when so acted upon, the cylindrical housing being pivotally connected to the coupler head.

5. A coupler according to claim 4 in which the other of the said members takes the form of a pivoted bell-crank lever which is pivotally moved in response to movement of the sensing member.

6. A coupler according to claim 1 in which the said second mechanism comprises a bell-crank lever having one arm adapted to be engaged upon an uncoupling movement of a coupled pair of couplers by a part of the adjacent coupler head and a second arm connected to the cylindrical housing.

7. A coupler according to claim 1 in which the coupler head is provided with a vertically-projecting lug and a bell-crank lever respectively adapted to engage a corresponding bell-crank lever and lug on an opposed coupler head to withdraw the connector from the opposing connector in an uncoupling operation.

References Cited

UNITED STATES PATENTS

| | | | |
|---|---|---|---|
| 1,453,817 | 5/1923 | Westinghouse | 213—1.3 |
| 2,229,902 | 1/1941 | Robinson | 213—76 |

DRAYTON E. HOFFMAN, *Primary Examiner.*

U.S. Cl. X.R.

213—1.3